E. FAVARY.
MECHANISM FOR PREVENTING EXCESSIVE SPEEDS OF AUTOMOBILES.
APPLICATION FILED SEPT. 19, 1906.

1,029,181.

Patented June 11, 1912.

2 SHEETS—SHEET 1.

WITNESSES:
Josephine Hart
Felix Frank

INVENTOR.
Ethelbert Favary

E. FAVARY.
MECHANISM FOR PREVENTING EXCESSIVE SPEEDS OF AUTOMOBILES.
APPLICATION FILED SEPT. 19, 1906.

1,029,181.

Patented June 11, 1912.

2 SHEETS—SHEET 2.

WITNESSES:
Josephine Hart
Felix Frank

INVENTOR
Ethelbert Favary

UNITED STATES PATENT OFFICE.

ETHELBERT FAVARY, OF NEW YORK, N. Y.

MECHANISM FOR PREVENTING EXCESSIVE SPEEDS OF AUTOMOBILES.

1,029,181. Specification of Letters Patent. Patented June 11, 1912.

Application filed September 19, 1906. Serial No. 335,270.

*To all whom it may concern:*

Be it known that I, ETHELBERT FAVARY, citizen of Hungary, and resident of 68 West Ninety-seventh street, New York, in the county of New York and State of New York, have invented certain new and useful Improvements in Mechanism for Preventing Excessive Speeds of Automobiles and other Vehicles, of which the following is a specification.

The object of the present invention is an arrangement to prevent excessive speeds of travel of automobiles, locomotives, street cars, railroad cars, or any other kind of motor vehicle, or ordinary or horse-drawn vehicle, car, or carriage, and to give audible warning when their speed exceeds a pre-determined limit.

In carrying out my invention I attach a governor or governors to convenient moving or rotating part or parts of a vehicle in such a manner that an excessive or predetermined speed of travel would automatically throw a braking action upon the wheels or other moving or rotating parts of the said vehicle. Furthermore, the governor or governors are made to sound a gong, bell, horn—or any other instrument producing an audible noise—whenever the said pre-determined speed is reached or exceeded.

Hereafter whenever I mention the word "vehicle" I mean any kind of automobile, locomotive, motor vehicle or horse drawn car or carriage; and whenever the word "gong" occurs it signifies any kind of bell or bells, gong or gongs, horn or horns, or any instrument or instruments producing a noise.

In the accompanying drawing forming part of this specification similar letters indicate similar parts throughout the several views.

Figure 1:
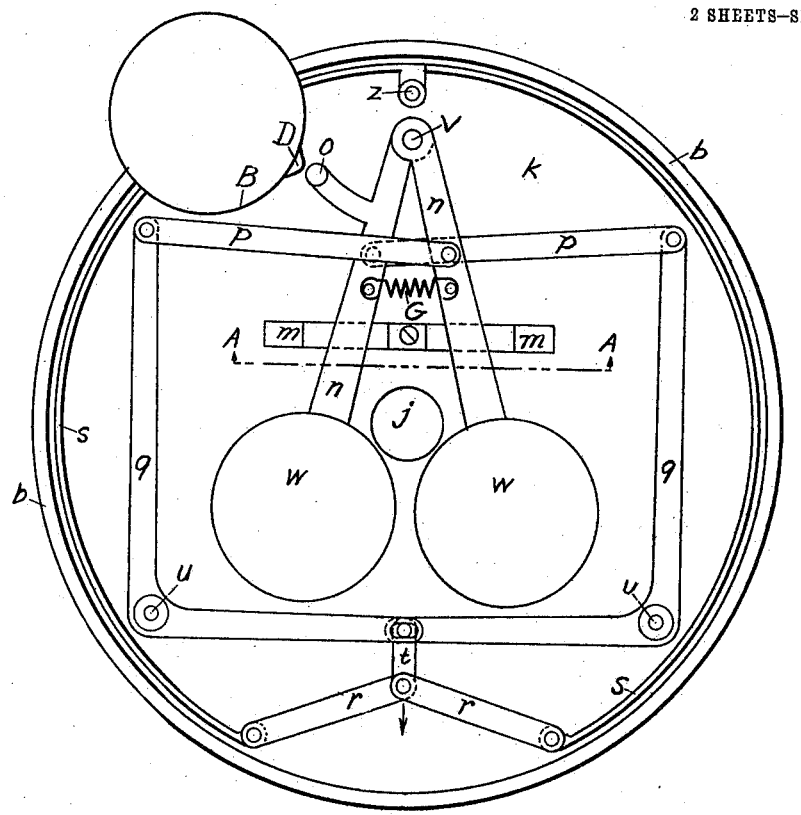
Figure 3:
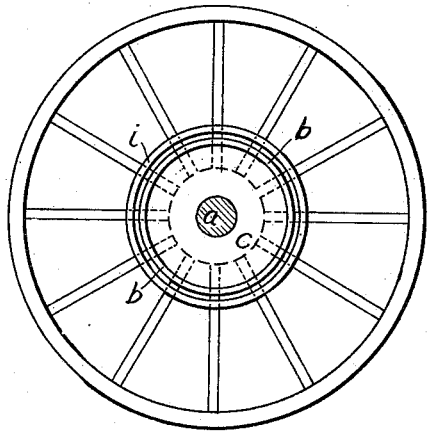
Figure 2:
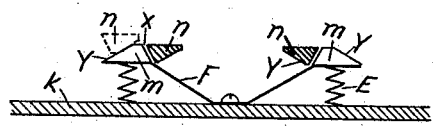
Figure 5:
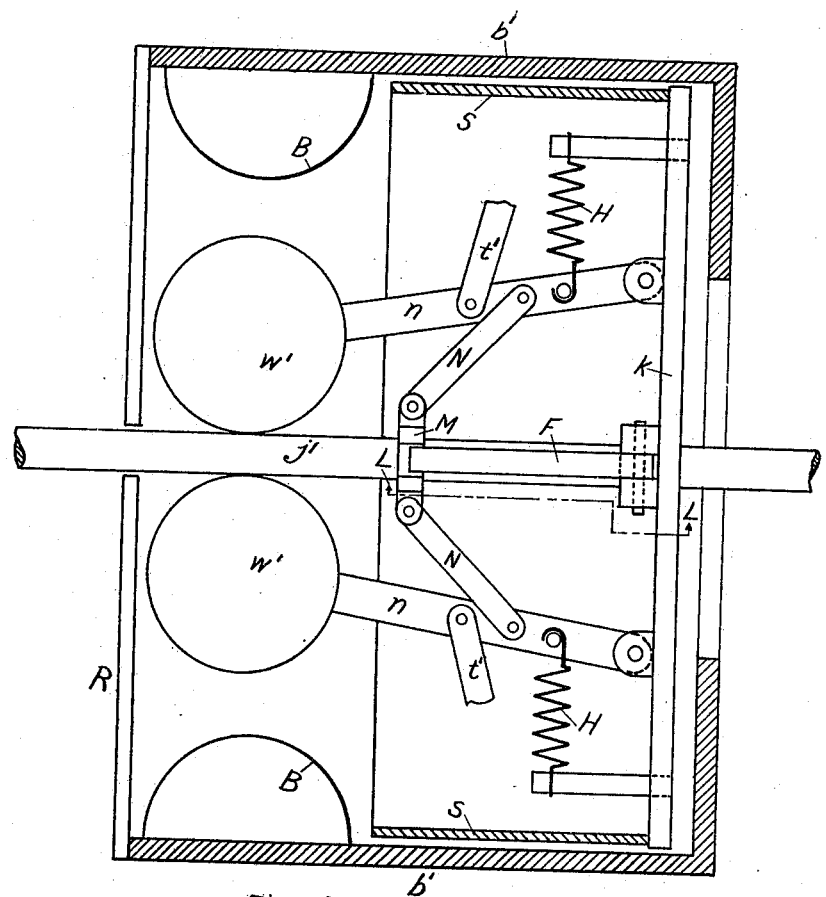
Figure 6:
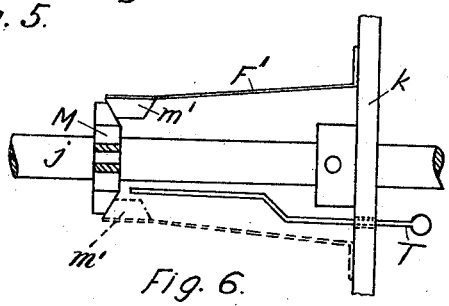

Figures 1 and 2 show diagrammatic representation of governors embodying my invention; Fig. 5 being the form of the device which will probably be found most suitable in practice: Fig. 2 is a section through "A A" of Fig. 1, and Fig. 6 is a sectional view through "L L" of Fig. 5; Fig. 3 shows a wheel containing a governor like that shown in Figs. 1 or 5: and Fig. 4 shows a part of a vehicle containing a governor.

"$a$" (Fig. 3) denotes the axle shaft upon which the wheel is rotated, or to which the wheel is fastened as the case may be; "$b$" is a stationary brake drum fixed to some stationary part of the vehicle; and "$c$" represents an inclosed space or casing containing the governor or any other suitable arrangement acting upon "$b$" when the rotation of the wheel exceeds a certain speed. "$c$" may also contain a gong actuated by the governor at certain speeds of the vehicle; "$i$" is the ordinary brake rim fastened to the wheel.

"$d$" (Fig. 4) designates the driving or sprocket wheel shafts of a motor vehicle to which the rear wheels of the vehicle, or in case of a chain driven motor vehicle the sprocket wheels are fastened; "$f$" denotes the differential gear or gear case; "$g$" the driving shaft coming from the transmission or speed change gears; "$h$" is the lower part of the frame or body of the motor vehicle and "$c$" the governor casings which are conveniently arranged and fastened upon the shafts "$d$" and the differential gear case, or the frame or body "$h$". The governor may be made to actuate a gong or to act like a brake upon the shafts "$d$", or it may actuate or sound a gong and put a braking action on the said shaft "$d$" when this shaft exceeds a certain number of revolutions. This braking action may be arranged to stop the vehicle entirely or only to reduce its speed. The governor or governors might be fixed to any convenient part of the vehicle or the wheels of the vehicle. There might be a governor in each wheel or only in the rear or the front wheels. The object of the gong in connection with the governor is to sound a warning whenever the vehicle is traveling faster than a pre-determined speed. The governor when made to put a braking action upon the vehicle is also useful when descending a steep hill, as the brakes of the vehicle may not be sufficiently powerful in their action to prevent an excessive speed, or the said brakes may get out of order, in which case this invention would automatically prevent the vehicle from running at excessive speeds, or if convenient arrange it so that it would stop the vehicle entirely. The inclosure "$c$" containing the governor, brake drum, brake bands and the gong, may if convenient be provided with lock and key and with a seal in order to enable government, state, county or city officials to keep the inclosure "$c$" locked and sealed thus preventing owners of automobiles or other persons to alter any adjustment therein. If a governor is adjusted to sound a gong when the vehicle is exceeding a speed limit set by law, the sound of the gong would attract the attention of police officers and it would warn pedestrians and others of the approach of the vehicle. Furthermore if a governor is also made to actuate a brake the speed of the vehicle would be retarded. There are many other ways in which this invention can be carried out, for instance, the governor may be made to close an electric circuit which would ring an electric bell and act upon electric brakes. In this case an electric generator or any other source of electricity, an electric bell and electric brakes could be inclosed in "c" or fixed to other parts of the vehicle. The governor may also be made to brake the electric circuit used for the electric ignition in motor vehicles having hydro-carbon engines, or it might be made to actuate the compressed air brakes or power brakes in vehicles using such brakes; or else it might be used to cut off the electric power in electric automobiles, or steam in steam automobiles.

Figure 4:
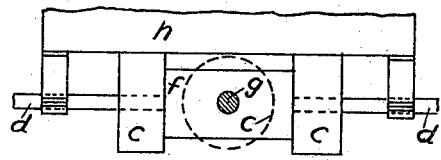

Fig. 1 shows an arrangement for putting a braking action upon the before mentioned stationary rim "b;" "k" is a disk fastened rigidly upon a wheel or upon a shaft here designated "j" (or upon "d" or "g" Fig. 4). Pivots "v" "z" "u" are fixed rigidly upon the said disk. "w" are weights which have a tendency to fly away from "j" when "k" is rotated upon its axis "j." As the weights "w" fly in an outward direction they exert a pull on the connecting links "p" which in their turn act upon the bell cranks "q" and the link "t," pressing the expanding links "r" in the direction of the arrow, thereby expanding the band "s" and thus creating friction between "s" and "b." "s" might be made of one piece or of two pieces pivoted at "z." The weights "w" are fastened to rods "n" which are pivoted at "v." "G" is a spring and "m" and "F" are auxiliary catches and springs to keep the weights "w" in position and preventing said weights to act before "k" reaches a certain speed. When a pre-determined speed is reached the weights "w" will overcome the action of the springs "G" and "F" (see Figs. 1 and 2) and press "m" toward the disk "k" when the centrifugal force of "w" will act upon the brake band "s." As soon as the speed decreases again, the spring "G" would pull "n" and thereby "w" to their original position. As can be understood from Fig. 2, which is a section through "A A." Fig. 1, the catch "m'" would prevent "n" from acting until the pressure of "n" exerted upon "m'" at the contact angle "x" becomes very large, but "n" once released by the spring catches would act with full force. The catches "m'" have therefore no control over the weights "w" when once released, in fact the other end of "n" might be conveniently shaped as shown at "y" so as to assist in pressing "n" (as shown dotted) and thereby the weights "w" outward, and thus increasing the braking power. ("n" dotted in Fig. 2 is for the sake of clearness shown in an elevated position, whereas in reality "m" would be depressed.) "E" are other springs that might be used to make "m'" more powerful in their action against "n."

If convenient "G" might be eliminated and auxiliary springs "H" employed as in Fig. 5, which shows another type of governor embodying my invention. In this embodiment of the device, the weights, designated w' and the catches m' and springs F' (see Fig. 6) are differently arranged, but act similarly to corresponding parts in Fig. 1. The springs H, Fig. 5, coöperate with the centrifugal force of the weights w', and the catches m' are sufficiently powerful to keep the weights w' in position, until the speed of rotation of the disk k secured to the shaft j' becomes excessive, at which time the catches m' and springs F' are overcome by the ring M sliding upon the shaft j' and actuated by the links N and a great braking effect is exerted upon the brake drum b' by means of the links t' similarly to that of Fig. 1. It is to be understood that the springs H can be made sufficiently powerful to exert any desired braking effect, without necessitating large weights w'. In this case (Fig. 5) the weights would not move back to their original position when the speed is reduced but auxiliary means such as "T" Fig. 6 are required to push them back to their normal position. The spring "G" Fig. 1, might if convenient be an expanding spring in which case the combined action of "G," "m'," and the centrifugal force of the weights "w" would exert a braking effect upon the vehicle. "B" denotes gongs which are actuated whenever the weights or balls "w" move in an outward direction. If convenient this can be effectuated by means of an arm "o" (Fig. 1) touching or hitting a projection "D" of the gong "B." "R" Fig. 5 shows a disk whereby the whole arrangement may be inclosed, locked and sealed.

It is understood that the governor described may be used to operate any other form of brake, used in practice.

It is to be noted that in both embodiments of my invention herein specifically illustrated, the parts M and n constitute keepers co-acting with the spring latches, the said parts M and n being thus referred to in some of the appended claims.

Having now described my invention what I claim as new and desire to protect by Letters Patent is:—

1. A governor, embodying a rotatable part, centrifugally acting weights carried thereby, spring catches arranged to hold the weights against centrifugal action up to a predetermined speed, and means auxiliary to the centrifugal action of the weights for positively moving said weights outwardly upon being released from said catches.

2. A governor, embodying a rotatable part, centrifugally acting weights carried by said part, a keeper connected to said weights and movable in a definite plane upon the outwardly swinging movement of the weights, and a latch carried by the rotatable part and engaging said keeper to resist the centrifugal action of the weights, the operative contacting faces of the keeper and latch being inclined, as specified.

3. A governor, embodying a rotatable part, centrifugally acting weights carried by said part, a keeper connected to said weights and movable in a definite plane upon the outwardly swinging movement of the weights, and a latch carried by the rotatable part and having oppositely inclined faces, one of which is arranged to resist the centrifugal action of the weights by engagement with the keeper and the other of which is designed to assist in the centrifugal action upon engagement with the keeper subsequent to the release of the first-named face from the keeper.

4. A governor, embodying a rotatable part, centrifugally acting weights carried by said part, a keeper connected to said weights and movable in a definite plane upon the outwardly swinging movement of the weights, and a spring latch arranged for engagement with the keeper to resist the centrifugal action of the weights, the engaging surfaces of the keeper and latch being so formed that upon the initial release of the keeper from the latch, the latch will assist in the centrifugal action of the weights.

Signed at 68 West 97th street, New York in the county of New York and State of New York this eighteenth day of September A. D. 1906.

ETHELBERT FAVARY.

Witnesses:
JOSEPHINE HART,
ADELE HART.